Oct. 4, 1932.    T. C. BISCHOFF ET AL    1,880,703
AUTOMOBILE TRAILER
Filed March 11, 1931
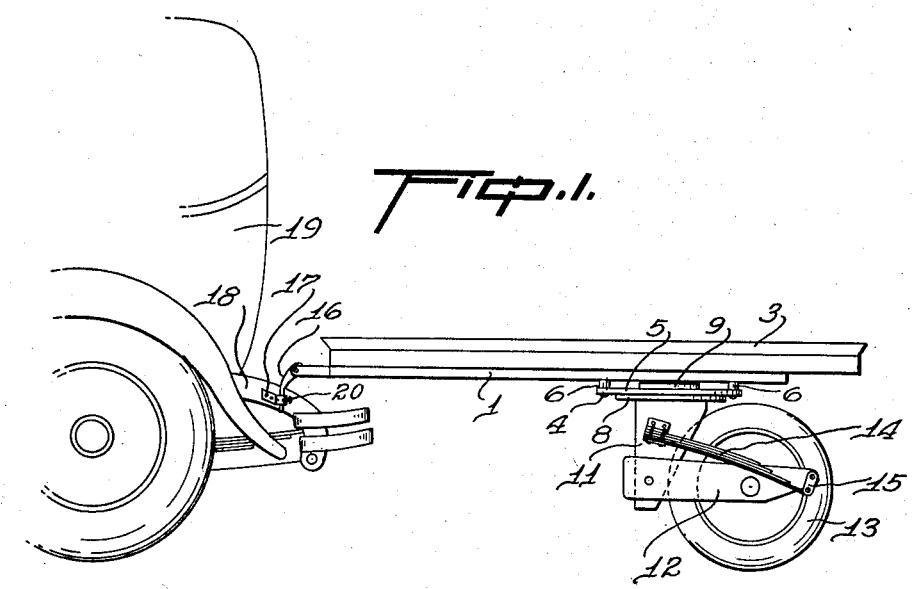
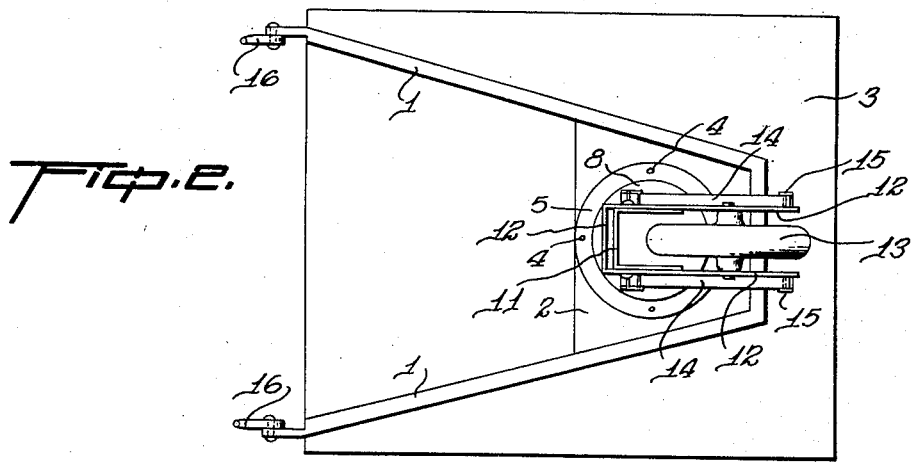
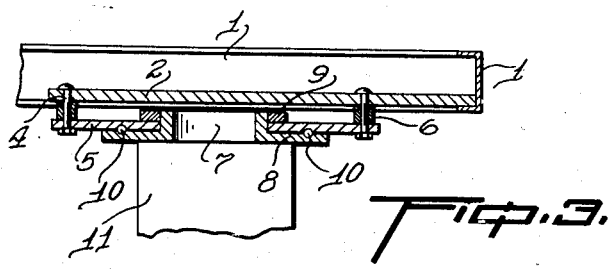
INVENTORS
Theodore C. Bischoff
Adam Rettig
George W. Chubb
BY
ATTORNEYS Patented Oct. 4, 1932

1,880,703

UNITED STATES PATENT OFFICE

THEODORE C. BISCHOFF, GEORGE W. CHUBB, AND ADAM RETTIG, OF DETROIT, MICHIGAN

AUTOMOBILE TRAILER

Application filed March 11, 1931. Serial No. 521,635.

The present invention pertains to a novel trailer for automobiles and like vehicles.

The primary object of the present invention is to provide a durable inexpensive trailer which may be readily attached to the rear end of an automobile to provide convenient means whereby luggage and travel necessities may be transported without inconveniencing the passengers in the automobile. The trailer comprises a substantially V-shaped frame for supporting a suitable box, the apex being supported by a wheel capable of swiveling while the ends of the frame are detachably connected to the rear end of the chassis frame, thus providing a trailer in which there is no side swinging or swaying while the automobile is in motion.

The invention further contemplates providing a trailer which does not in any manner require special maneuvering when the automobile is being backed into a parking space, it being unnecessary to steer the trailer by maneuvering the automobile as is required with ordinary trailers.

With the above and other ends in view the invention consists in matters hereinafter set forth and more particularly pointed out in the appended claims, reference being had to the accompanying drawing, in which Figure 1 is a side elevation of the present trailer attached to the rear of an automobile;

Fig. 2 is a bottom plan view of the trailer, and

Fig. 3 is an enlarged cross sectional view of the wheel swivel.

Like characters of reference are employed throughout to designate corresponding parts.

The numeral 1 indicates a framework formed substantially in the shape of a V having the apex reinforced with a plate 2. Mounted upon the top of the frame 1 and secured in any suitable manner is a box 3, providing a suitable receiver for various kinds of luggage. Secured to the plate 2 by means of bolts 4 is a disk 5, the disk being held in spaced relation of the plate 2 by means of sleeve-like spacers 6 which surround the bolts 4.

The disk 5 is provided with a central opening through which a portion 7 of a ring 8 projects, a retaining member 9 being provided on the portion 7 to hold the disk and ring in this relative position. Grooves are provided in the disk and plate to receive the ball bearings 10 which reduce the amount of friction between the disk and ring when the latter is rotated.

A post 11 is secured to the lower face of the ring 8 and pivotally mounted adjacent the lower end of the post is a fork 12 having a wheel 13 rotatably mounted in the outer end thereof. A half elliptic leaf spring 14 is secured on each side of the post 11 and projects outwardly, the outer ends being attached by shackles 15 to the outer ends of the fork 12 to resiliently prevent pivotal movement of the fork relative to the post.

The outwardly projecting portions of the frame 1 are provided with pivoted link members 16 having their ends shaped to enter sleeve-like retaining members 17 that are secured to the rear portion of the chassis frame 18 of the automobile 19. The links 16 may be secured in the retaining member in any suitable manner, the drawing illustrating a set screw 20 as an example of one mode of doing the same.

It is apparent from the foregoing description that the trailer is attached at its forward end in a manner permitting vertical movement of the frame relative to the automobile yet preventing lateral movement. The end remote from the automobile is supported by a wheel capable of swiveling through three hundred and sixty degrees and the wheel is mounted with springs that absorb most of the road shock instead of transmitting it to the trailer frame.

Although a specific embodiment of the present invention has been illustrated and described it is to be understood that various changes may be made in the details of construction without departing from the spirit of the invention as defined in the following claims, and such changes are contemplated.

What we claim is:

1. A trailer comprising a frame having means for attaching the same to a motor vehicle, a post rotatably supported in said frame and projecting downwardly therefrom, a fork member pivotally mounted adjacent one of its ends on said post, a wheel supported intermediate the ends of said fork member, and leaf springs mounted on each side of said post and having their outer ends secured to the outer ends of said fork member.

2. A trailer comprising a frame having means for attaching the same to a motor vehicle, a post of substantially U-shaped cross section rotatably mounted in said frame to project downwardly therefrom, a fork member pivotally mounted adjacent one of its ends on said post, a wheel mounted intermediate the ends of said fork and projecting into said U-shaped post in a manner to permit pivotal movement of said fork, and leaf springs mounted on the sides of said post and connected by links at their outer ends to the outer ends of said fork members.

In testimony whereof we affix our signatures.

THEODORE C. BISCHOFF.
ADAM RETTIG.
GEORGE W. CHUBB.